Aug. 3, 1965  J. W. OLSON ETAL  3,198,877
POTHEAD CLOSURE SEALED WITH BISMUTH-TIN ALLOY
Filed Feb. 9, 1962
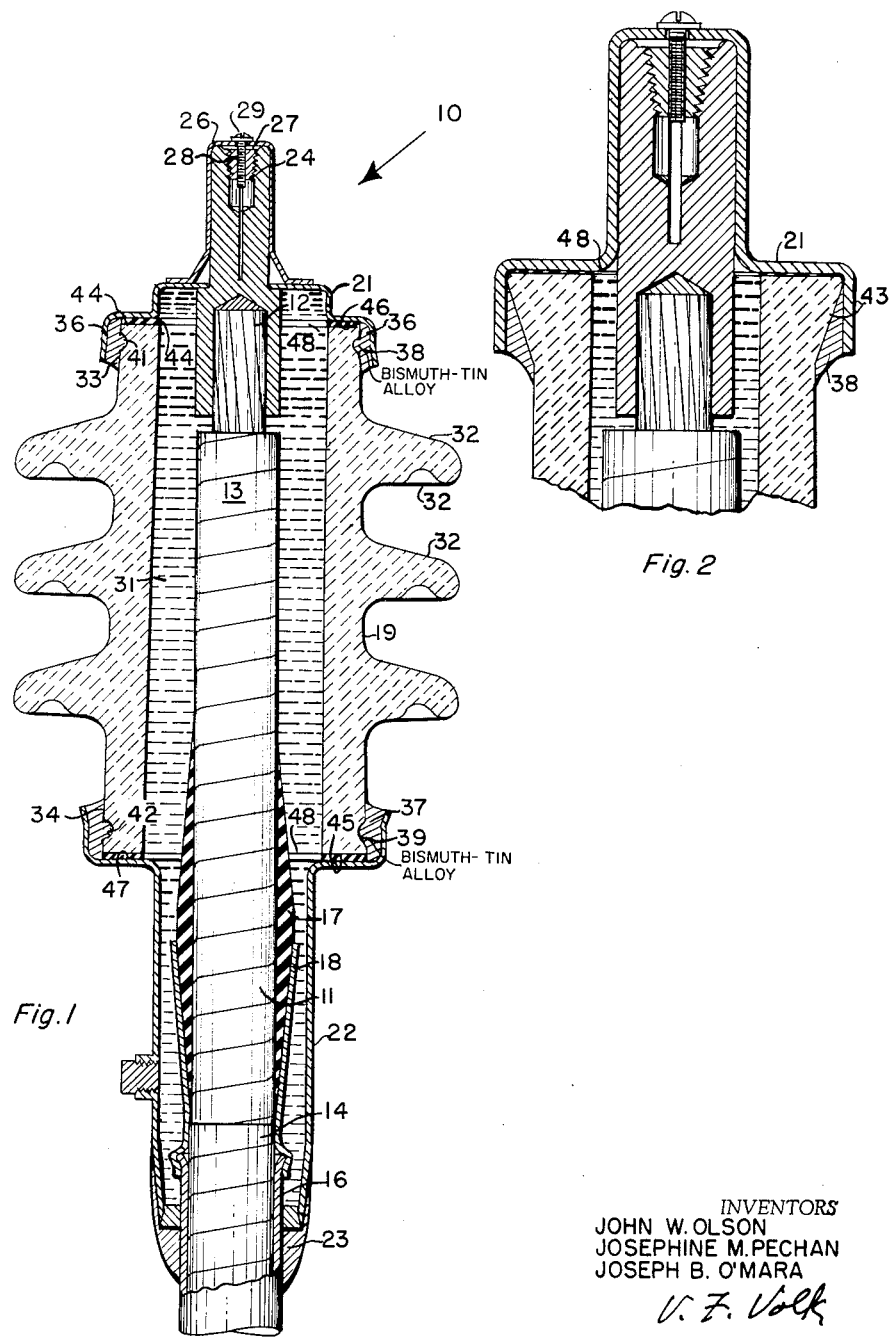
INVENTORS
JOHN W. OLSON
JOSEPHINE M. PECHAN
JOSEPH B. O'MARA
*V. F. Volk*
THEIR AGENT

United States Patent Office 3,198,877
Patented Aug. 3, 1965

3,198,877
POTHEAD CLOSURE SEALED WITH
BISMUTH-TIN ALLOY
John W. Olson, Dobbs Ferry, Josephine M. Pechan, Yonkers, and Joseph B. O'Mara, Hastings on Hudson, N.Y., assignors, by mesne assignments, to Anaconda Wire and Cable Company, a corporation of Delaware
Filed Feb. 9, 1962, Ser. No. 172,142
6 Claims. (Cl. 174—74)

Our invention relates to electrical potheads and particularly to potheads wherein metallic closures are sealed to a ceramic insulator.

For terminating and joining electrical components such as electric cables it has long been known to employ a pothead comprising a hollow insulator into which the component is inserted. The insulator is capped by a metal hood in electrical engagement with the conducting elements of the component and a metal entrance sleeve sealed to the grounded surface of the component. The space external to the component within the insulator is filled with an insulating fluid. In order to prevent leakage of the insulating fluid it is necessary to maintain a fluid-tight seal between the insulator and the metal closures. In the prior art this has been accomplished, in one method, by interposing a gasket of resilient material such as neoprene between the metal closures and the insulator and compressing the gasket mechanically as by tightening bolts applied between a flange in the closure and a flange in the insulator. Gasketed potheads have not been entirely satisfactory due to eventual leakage of compound caused by loss of resiliency in the gasket, relaxation of the mechanical pressure, chemical reaction between the insulating fluid and the gasket material, and other causes known to affect the reliability of gasket joints.

Another known method of sealing metal closures to ceramic insulators has been to so treat the ceramic surface that it will take a solder bond and then solder the hood to the prepared surface of the insulator. This has involved a plating operation in which metallic silver has been plated onto the surface of the ceramic after first rendering said surface conducting. The process has required special skills, is inherently time consuming and expensive and requires a high temperature bake to bond the metallic silver to the ceramic.

It is an object of our invention to produce a superior pothead having a permanently sealed, leak-proof, connection between the closures and the insulator.

It is a further object of our invention to provide a pothead seal without introducing thermal stresses by baking at high temperature.

It is a further object of our invention to provide a pothead seal that is inexpensive and does not require special skills and equipment.

In fulfillment of these and other objects we have invented a pothead comprising a hollow ceramic body member having an outer wall and at least one open end, a metal closure covering the open end and extending over the wall and a metal alloy that decreases in density when passing from a liquid to a solid state filling an annular space between the wall and the closure. The alloy is free from bonding to the wall and forms a mechanical seal between the wall and the closure. The alloy preferably comprises 45–60% by weight of bismuth and 55–40% by weight of tin and most preferably equal parts by weight of bismuth and tin. We have invented a pothead as above with a ceramic glaze coating the wall under the closure, and with a groove in the wall under the closure and/or with the wall tapering away from the end under the closure. We have invented a pothead with an unglazed surface cut square at one end and a flat metal surface inside the closure matching the unglazed ceramic surface and a vulcanized adhesive bond between them which is preferably a silicone-rubber or fluorosilicone.

A more thorough understanding of our invention may be gained from the appended drawing.

In the drawing:

FIGURE 1 is an elevation, partly in section of a pothead of our invention.

FIGURE 2 is an enlarged section of a pothead closure made to an embodiment of our invention.

In FIGURE 1 a pothead of our invention indicated generally by the numeral 10 serves to terminate an electrical component which, in this case is an electric cable 11 having a conductor 12, wrapped insulation 13, shielding tape 14, and lead sheath 16. A stress-relief cone 17 has been wrapped around the insulation 13 in a known manner and a conducting surface 18 extends from the sheath 16 up the surface of the cone 17. A ceramic insulator 19 constitutes a hollow body member surrounding the cable 11 and is closed at the top by a metal hood 21 and at the bottom by a metal entrance sleeve 22. A solder wipe 23 seals the sleeve 22 to the sheath 16, and the conductor 12 is soldered to a stem 24 that fits into a cup-like recess 26 in the hood 21. We prefer to employ the stem connection described in Patent 2,903,501 issued to one of the applicants of the instant invention wherein the stem 24 is split and is expanded against the inside of the recess 26 by turning a threaded wedge 27 into the split end of the stem 24. The wedge 27 has an internal tap 28 so that a screw 29 can lock it to the top of the recess 26. The present invention is, however, directed to means for sealing metal pothead closures such as the hood 21 and entrance sleeve 22 to ceramic bodies such as the insulator 19 and is not limited to any particular means for connecting the electrical components to the closures. The pothead 10 is filled with an insulating fluid 31 which expands upon heating and would leak out of the joints between the insulator 19 and the closures 21, 22 in the absence of a tight seal between the metal and the ceramic. The insulator 19 has an outer surface 32 which is glazed to discourage the adherence of contaminating particles that would reduce the electrical resistance of the surface. It has been known to remove or omit the glaze from portions 33, 34 of the surface of the insulator 19 covered by the respective closures 21, 22 so that a metallic coating such as a silver deposit could be bonded to the ceramic in an operation involving a high temperature bake. The closures were then soldered to the silver after copper-plating and tinning the latter. It has generally been accepted that any fluid-tight bond between a ceramic or vitreous surface and the surface of a metal requires some means of achieving an adhesive bond of metal to the nonmetallic surface. We have found, surprisingly, that a leak-proof seal can be achieved in the absence of any adhesive bonds and that the improved seal will remain fluid-tight under internal pressure and after repeated temperature cycling. To make the seal of our invention the surfaces 33, 34 are glazed and annular spaces 36, 37 between the insulator 19 and the closures 21, 22 are filled with an alloy that expands, i.e., undergoes a decrease in density, upon solidifying and forms rings 38, 39. We have found that the rings 38, 39 of an alloy of 55–60% bismuth and 45–40% tin by weight will make a tight seal and we prefer to use a bismuth-tin alloy of equal parts by weight. Although the seal of our invention will remain tight through repeated temperature cycling, since there is no adhesive bond between the porcelain surface of the insulator 19 and the alloy rings 38, 39, the build-up of moderate pressures in the interior of the pothead 10 will cause the closures 21, 22 to slide off the insulator 19 in the absence of any restraining means. For this reason we have formed grooves 41, 42 in the respective surfaces 33, 34 that permit the closures to resist internal pressure. Alternatively, as in FIGURE 2 the wall of the insulator is tapered away from the open end at a portion 43 giving the ring 38 of alloy a wedge shape that, since the alloy 38 does bond to the closure 21, although it does not bond to the glazed surface of the ceramic, prevents endwise movement of the closure 21. Since the pouring temperature of our alloy is moderate no thermal strains are introduced into the ceramic in the process of making our seal.

The open ends of the insulator 19 are cut square to form unglazed flat surfaces 44, 45 normal to the axis of the pothead. Correspondingly to closures 21, 22 have internal flat surfaces 46, 47 that match the respective surfaces 44, 45 and preferably extend the full width of the said surfaces. Between the surfaces 44–46 and 45–47 we apply a vulcanizable adhesive 48 that is capable of withstanding the tempearture changes resulting from electrical loading of the termination, and is unaffected by the liquid dielectric 31. Preferably the adhesive 48 will be self-vulcanizing and we have found that a silicone-rubber adhesive such as the product supplied by Dow Corning Corporation, Midland, Michigan under the designation Silastic RTV731 is eminently satisfactory. Another adhesive that we have found suitable for use as the adhesive 48, also supplied by the Dow Corning Corporation is a fluorosilicone compound designated Q–2–0046 having outstanding oil resistance.

PROCEDURE

In the practice of our invention we have found it advantageous to use the following procedure to assemble the pothead 19. The surfaces 33, 34, 44, 45 of the porcelain insulator 19 are cleaned by immersion in a solution of $K_2Cr_2O_7$ in concentrated $H_2SO_4$, rinsed with warm water, and dried in a low temperature oven. The hood 21 and sleeve 22 are formed from copper by spinning in a known manner, unannealed, and are tinned except for the surfaces 46, 47. The areas 46, 47 are cleaned by scouring with steel wool and the surfaces 44, 45, 46, 47 are wiped clean with acetone and with a primer such as Dow Corning primer QA–2–1011 and air dried for at least 30 minutes. A coating of the adhesive 48 is applied to the surface 44 which is pressed to the surface 46 using a jig for centering and only enough pressure to insure good contact. Adhesive 48 is applied to the surface 45 and the sleeve 22 positioned so that the surface 47 is centered against the surface 45 and the assembly is allowed to cure 72 hours at room temperature. Clean 50–50 (Bi-Sn) is poured into the space 37 at 400±10° F. while heating the sleeve with a torch to make sure the alloy is completely melted and void free. After solidifying, the upper surface of the ring 39 is smoothed with a hot soldering iron. Clean 50–50 (Bi-Sn) is then poured into the space 36 and the ring 38 is similarly smoothed.

*Example 1*

A hollow porcelain insulator about 9 inches long with an inside bore of 2 inches and an outside diameter at both ends of 2¾ inches was fitted with tinned copper caps having lips extending about ¾ inch over the walls of the insulator and the insulator walls were double grooved with hemispherical grooves of 1/16 inch radius spaced ⅛ inch from the end and from each other. The entire outer surface of the insulator was glazed and the caps had central bosses tapped to receive pressure gages and filling nipples. The caps were sealed to the insulator by filling the annular space with a 50–50 by weight bismuth-tin alloy having a melting range of 290–300° F., and after the alloy had cooled to room temperature the insulator was filled with compressed air at 20 p.s.i.g. The assembly was then placed in an oven and heated at 100° C. for 312 hours. After removal from the oven the assembly was subjected to a thermal shock test by cooling it to −18° C. for 2 hours, plunging into water at room temperature and remaining there for 1 hour, heating for 1 hour at 100° C., plunging into water at room temperature and holding overnight at room temperature. The assembly was then placed in the air oven and heated for an additional 193 hours at 100° C. and again subjected to the thermal shock test described above. Thereafter the assembly was heated again in the oven for 91 hours at 100° C. No leaks occurred during these tests as determined by testing with a liquid detergent bubble detector.

*Example 2*

A capped insulator was prepared in accordance with Example 1 except that an alloy of 58 parts bismuth, 42 parts tin, by weight, melting at 281° F. was used as a sealant. The assembly was given the thermal shock test described in Example 1 and was cycled for alternate one-hour periods at 100° C. and at room temperature for 54 cycles without leakage.

*Example 3*

A capped insulator was prepared in accordance with Example 1 except that an alloy of 54 parts by weight of bismuth to 46 parts by weight of tin was used as sealant and the end surfaces of the insulator were coated with Silastic RTV731 silicone-rubber compound cured in contact with the caps for 6 days at room temperature before the alloy was poured. No leakage was observed when the assembly was submitted to the thermal shock test of Example 1.

*Example 4*

An assembly was prepared in accordance with Example 1 using 58–42% bismuth-tin alloy by weight but with fluorosilicone Q–2–0046 compound applied to the ends of the insulator and cured for one week in contact with the caps before pouring the alloy. The assembly was aged for 16 hours at 100° C., cycled alternately for 1 hour at room temperature and 1 hour at 100° C. for 61 cycles, and alternately at room temperature and at 110° C. for 27 cycles, and also submitted to the thermal shock test of Example 1 without loss of pressure or evidence of leaking.

We have invented a new and useful article of manufacture for which we desire an award of Letters Patent.

We claim:
1. A pothead comprising:
   (a) a hollow ceramic body member having an outer wall and at least one open end, said wall being tapered away from said end,
   (b) a metal closure covering said end and extending over said wall,
   (c) an alloy comprising 45–60% by weight of bismuth and 55–40% by weight of tin filling an annular space between said wall and said closure,
   (d) said alloy being free from bonding to said wall, and
   (e) said alloy forming a mechanically wedged seal between said wall and said closure due to the taper of said wall.
2. A pothead comprising:
   (a) a hollow ceramic body member having an outer wall and at least one open end, said wall being tapered away from said end,
   (b) a metal closure covering said end and extending over said wall,
   (c) a ceramic glaze coating said wall under said closure,
   (d) an alloy comprising 45–60% by weight of bismuth and 55–40% by weight of tin filling an annular space between said glazed wall and said closure,
   (e) said alloy being free from bonding to said wall, and
   (f) said alloy forming a mechanically wedged seal between said wall and said closure due to the taper of said wall.

3. A pothead comprising:
(a) a hollow ceramic body member having an outer wall and at least one open end,
(b) a metal closure covering said end and extending over said wall,
(c) sides defining a groove in said wall under said closure,
(d) an alloy comprising 45-60% by weight of bismuth and 55-40% by weight of tin filling said groove and a contiguous annular space between said groove wall and said closure,
(e) said alloy being free from bonding to said wall, and
(f) said alloy forming a mechanical seal between said wall and said closure.

4. A pothead comprising:
(a) a hollow ceramic body member having an outer wall and at least one open end,
(b) a metal closure covering said end and extending over said wall,
(c) a ceramic glaze coating said wall under said closure,
(d) sides defining a groove in said wall under said closure,
(e) an alloy comprising 45-60% by weight of bismuth and 55-40% by weight of tin filling said groove and a contiguous annular space between said glazed, grooved wall and said closure,
(f) said alloy being free from bonding to said wall, and
(g) said alloy forming a mechanical seal between said wall and said closure.

5. A pothead comprising:
(a) a hollow ceramic body member having an outer wall and at least one open end, said wall being tapered away from said end,
(b) a metal closure covering said end and extending over said wall,
(c) said wall being cut square providing a flat unglazed surface at said end,
(d) a flat metal surface inside said closure matching said unglazed surface,
(e) a vulcanized adhesive bond between said unglazed surface and said metal surface,
(f) an alloy comprising 45-60% by weight of bismuth and 55-40% by weight of tin filling an annular space between said wall and said closure due to the taper of said wall,
(g) said alloy being free from bonding to said wall, and
(h) said alloy forming a mechanically wedged seal between said wall and said closure.

6. A pothead comprising:
(a) a hollow ceramic body member having an outer wall and at least one open end, said wall being tapered away from said end,
(b) a metal closure covering said end and extending over said wall,
(c) said wall being cut square providing a flat unglazed surface at said end,
(d) a flat metal surface inside said closure matching said unglazed surface,
(e) a self-vulcanizing silicone-rubber adhesive bonding said metallic surface to said unglazed surface,
(f) a ceramic glaze coating said wall under said closure,
(g) an alloy comprising 45-60% by weight of bismuth and 55-40% by weight of tin filling an annular space between said glazed wall and said closure,
(h) said alloy being free from bonding to said wall, and
(i) said alloy forming a mechanically wedged seal between said wall and said closure due to the taper of said wall.

References Cited by the Examiner

UNITED STATES PATENTS

| | | | |
|---|---|---|---|
| 1,851,671 | 3/32 | Johnson et al. | 174—196 X |
| 1,981,717 | 11/34 | Austin | 174—167 X |
| 2,274,954 | 3/42 | Dykstra et al. | 174—189 X |
| 2,310,201 | 2/43 | Cox | 174—19 X |
| 2,791,622 | 5/57 | Nicholas | 174—20 |
| 2,900,438 | 8/59 | Hirtner | 174—18 X |

OTHER REFERENCES

Hansen, Max: Constitution of Binary Alloys, 2d ed., New York, McGraw-Hill, 1958, page 337.

DARRELL L. CLAY, *Primary Examiner.*

JOHN P. WILDMAN, E. JAMES SAX, *Examiners.*